UNITED STATES PATENT OFFICE.

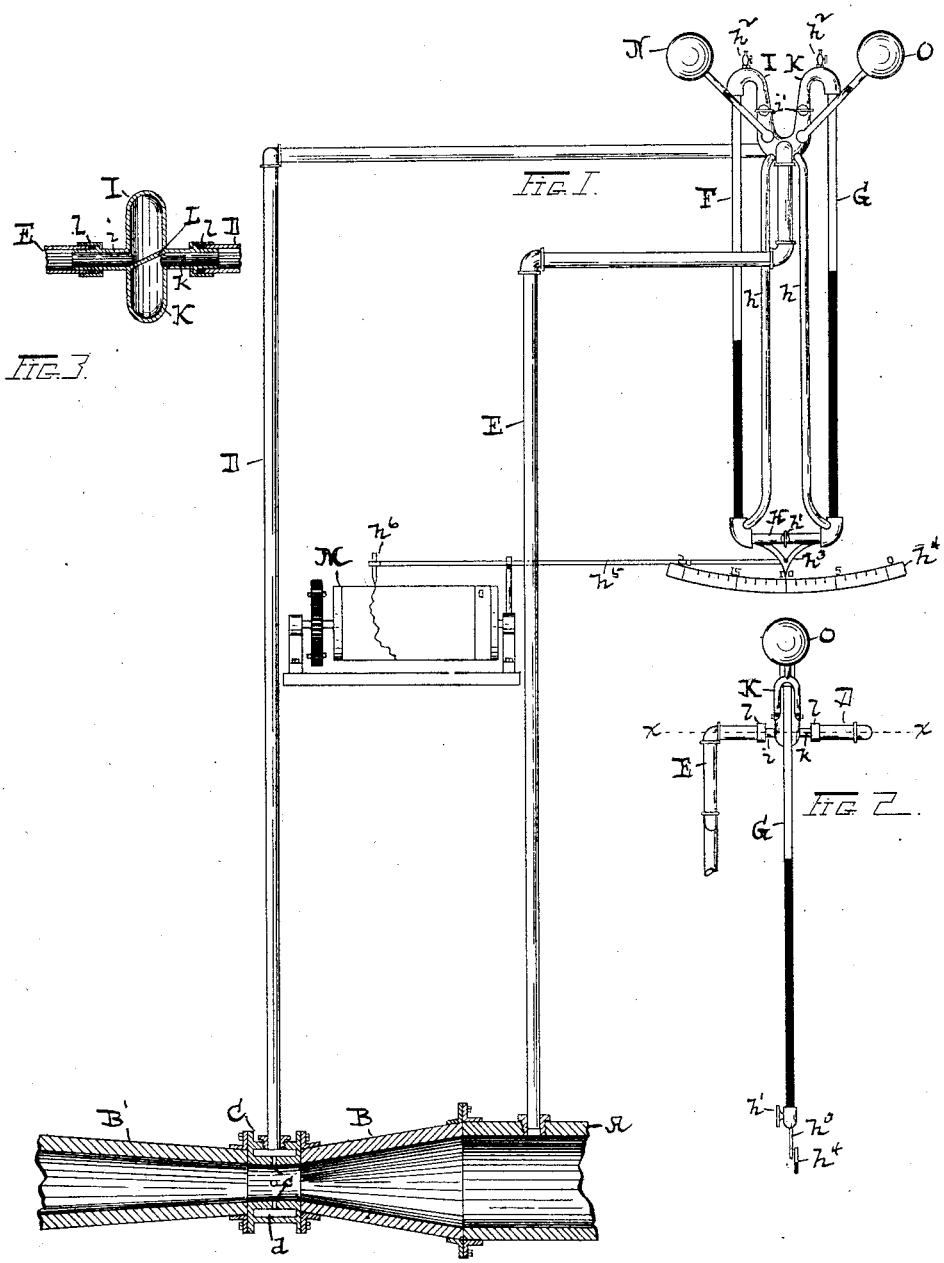

CLEMENS HERSCHEL, OF HOLYOKE, MASSACHUSETTS.

APPARATUS FOR INDICATING AND RECORDING PRESSURE OR DIFFERENCES OF PRESSURE.

SPECIFICATION forming part of Letters Patent No. 387,877, dated August 14, 1888.

Application filed March 29, 1888. Serial No. 268,733. (No model.)

*To all whom it may concern:*

Be it known that I, CLEMENS HERSCHEL, of Holyoke, in the county of Hampden and Commonwealth of Massachusetts, have invented a new and useful Apparatus for Indicating and Recording Pressures or Differences of Pressure, of which the following is a specification, reference being had to the accompanying drawings, forming part thereof.

The object of my invention is to provide a gage which, when operatively connected with two pipes or tubes serving as conduits for fluid or liquid under pressure, will indicate differences of the pressure of the fluid or liquid in said pipes or tubes, such indication being, moreover, in the form of a movement of the gage itself, which can be accurately measured.

A further object of the invention is to combine with a gage of this nature means for making a permanent record of the action of said gage.

To these ends my invention consists in the apparatus hereinafter fully described, and particularly pointed out in the claims.

In Letters Patent No. 381,373, issued to me on the 17th day of April, A. D. 1888, I have shown, described, and claimed an apparatus for measuring the quantity of liquid flowing through a pipe or tube, and for the purpose of illustrating the operation of the apparatus forming the subject of my present invention I have shown it in connection with one form of the apparatus shown and described in my said previous patent.

In the drawings, in which like letters designate like parts in the several views, Figure 1 is a front view of the indicating and recording apparatus as applied to the metering apparatus forming the subject of my previous patent, the latter being shown partly in section. Fig. 2 is a side elevation of the indicating-gage. Fig. 3 is a horizontal section taken upon line $xx$ of Fig. 2.

The letter A designates a pipe or conduit for water or other liquid, in which is located an ajutage composed of a converging section, B, a diverging section, B', and a throat-piece, C, located between said sections. At its point of smallest cross-section the throat-piece is provided with a series of radial perforations, $c$, leading to an annular air-chamber, $d$, located within the shell of said throat-piece.

The letter D designates a tube, which communicates with air-chamber $d$ of the throat-piece, and E designates a similar tube communicating with the cylindrical portion of pipe A at a point adjacent to the ajutage.

As fully explained in my said previous patent, so long as the water or other liquid remains stationary within pipe A and the ajutage—*i.e.*, does not flow therethrough—said liquid will stand in tubes D E and at its source at the same level, and the pressure in said tubes D E will be equal. As soon as the liquid commences to flow through the pipe and ajutage, however, the suction created thereby through perforations $c$ and air-chamber $d$ will depress the level of the column of liquid in tube D, or, in other words, decrease the pressure therein, and by measuring the difference of pressure in tubes D E the head of the liquid at the point of smallest cross-section of the ajutage can be determined, and from this data the quantity of liquid flowing through pipe A in a given space of time can be computed, as clearly pointed out in my previous patent.

As hereinbefore stated, I have shown the apparatus forming the subject of the present application applied to the liquid-metering apparatus, wherein its function is to indicate and also to make a permanent record of the differences of pressure in tubes D E during a given space of time, and consequently of the rates of flow of the liquid through pipe A during the same period.

The indicating apparatus is constructed as follows: Two glass tubes, F and G, partially filled with mercury, are united at their lower ends by a pipe, H, which may be made from any metal which the mercury will not corrode, and at their upper ends said tubes are rigidly connected to hollow arms I K, respectively. Arms I K, which are preferably shaped as shown, are connected together at their ends opposite to their point of connection with tubes F G, but have no interior communication with each other. I prefer to make said arms integral with each other and to separate them internally by a partition, L, as shown in Fig. 3. A short tube, $i$, extends laterally from arm I at one side of partition L, and a similar tube, $k$, extends in the opposite direction from arm K upon the opposite side of said partition, the axes of said tubes being in one and the same straight line. Braces $h$, extending between arms I K and the lower ends of tubes F G, serve to increase the rigidity of the connection between said tubes and arms.

The short tubes $i\,k$ are inserted within the ends of tubes E D, respectively, and stuffing-boxes $l$ make a tight joint between said tubes, while permitting the former tubes to have a free revolving movement within the latter. Communication is thus established between tubes E and F and between tubes D and G through arms I K, respectively, and valves $i'$ in said arms enable such communication to be closed at will. A valve, $h'$, in pipe H governs the communication between tubes F G, and petcocks $h^2$ in arms I K provide for the removal of air from said tubes. The short tubes $i\,k$, when thus mounted in tubes E D, form trunnions upon which the gage F G H I K is free to oscillate. When the pressure in tubes E D is equal, valves $i'$ and $h'$ being open, the mercury will stand at the same level in tubes E G, and said tubes will occupy a vertical position; but whenever the pressure in one of said tubes—for instance, in tube E—exceeds that in the other tube a portion of the mercury in tube F will be caused to pass through pipe H into tube G, and the increased weight in the latter tube will cause the gage F G H I K to swing upon its trunnions in order to re-establish a state of stable equilibrium.

It is obvious that various devices for indicating the amount of the movement of the gage could be used, and I have shown as one example of such means a pointer, $h^3$, projecting from the lower end of the gage, and a graduated arc, $h^4$, located adjacent to the path of movement of said pointer. By locating the zero-point of said arc in the vertical plane of the axes of the tubular trunnions $i\,k$ the pointer $h^3$ will indicate upon the arc the relative pressures in tubes D E at all times.

To make a permanent record of the movements of the gage, and consequently of the variations of pressure in tubes E D, I connect one end of a rod, $h^5$, to pointer $h^3$ and attach to the opposite end of said rod a pen or pencil, $h^6$, which rests upon a sheet of paper carried by the drum or cylinder M, which is uniformly revolved by clock-work, as is common in recording-gages. The line traced by the marking-instrument upon either side of a zero-line upon the paper corresponding to the zero-point upon arc $h^4$ will constitute a permanent record of the variations of the pressure in tubes E D for any given period of time.

When the indicating and recording apparatus thus constructed is used in connection with my novel metering apparatus, as shown in the drawings, inasmuch as the pressure in tube E is always greater than that in tube D whenever liquid flows through pipe A, I prefer to locate the zero-point upon the graduated arc at one extremity of the movement of pointer $h^3$, as shown, and to secure weights N O to the swinging gage, so adjusted that when the mercury stands at the same level in tubes F G—i. e., when the liquid in pipe A is stationary—the pointer $h^3$ will stand at said zero-point. As soon, then, as the liquid begins to flow through pipe A, the greater pressure in tube E will transfer a portion of the mercury in tube F to tube G, and the gage will swing upon its trunnions, as before described, and the new position of the pointer upon the graduated arc will indicate the rate of flow, in cubic feet per second if desired, of the liquid through said pipe A, as fully described in my said previous patent. From this data, as continuously marked upon the paper of the recording-instrument, the quantity of liquid flowing through said pipe in a given space of time can be readily computed. It will be understood, however, that, so far as my present invention is concerned, the tubes D E may be any tubes containing fluid or liquid under pressure the difference of pressure in which it is desired to indicate and record.

It is obvious that by leaving the upper end of one of the tubes F G open to the atmosphere the swinging gage can be used like the ordinary pressure-gage to indicate and record the variations of pressure in a single tube or pipe.

I do not wish to limit myself to the exact conformation or relative proportions of the several parts of the indicating and recording gage herein shown and described, as modifications therein can be made without departing from the spirit of my invention.

Having thus fully described my invention, what I claim, and desire to secure by Letters Patent, is—

1. The apparatus for indicating differences of pressure herein described, consisting of two tubes containing mercury and located upon opposite sides of and equidistant from a common pivotal support, said tubes being in open communication with each other at one end and at their opposite ends being in open communication, respectively, with two sources of pressure, whereby differences of pressure will cause a displacement of the mercury in said tubes, and will thereby cause them to swing upon their pivot, and means, such as a pointer and graduated arc, for indicating the amount of the swinging movement of said tubes, combined and operating substantially as set forth.

2. The apparatus for indicating differences of pressure herein described, consisting of two tubes containing mercury and having open communication with each other at one end, each of said tubes at its opposite end being connected with a tubular trunnion, which trunnions have their axes in one and the same straight line and project laterally in opposite directions, suitable supports for said trunnions, whereby said mercury-tubes are permitted to have a free oscillatory movement thereon, and conduits connecting said trunnions, respectively, with the primary sources of pressure, arranged and operating substantially as set forth.

3. The apparatus for indicating differences of pressure herein described, the same consisting of two tubes containing mercury and having open communication with each other at their lower ends, two hollow arms to which said tubes are rigidly connected at their upper ends, said arms being connected together, but having no internal communication with each other, two tubular trunnions projecting laterally in opposite directions from said arms, respectively, the axes of which trunnions lie in one and the same straight line, two tubes or pipes leading from the respective sources of fluid or liquid under pressure, within the ends of which said tubular trunnions are mounted in such manner as to have a free revolving movement, a pointer connected to said mercury-tubes at or near their lower end, and a graduated arc or similar device located adjacent to the path of movement of said pointer, combined and operating substantially in the manner and for the purpose set forth.

4. The combination, with two tubes, as D E, having their adjacent ends located in one and the same straight line, of hollow arms I K, shaped substantially as shown and separated internally by partition L, tubular trunnions $i$ $k$, projecting laterally in opposite directions from said arms into the ends of said tubes, respectively, stuffing-boxes or similar devices for making a tight joint between said trunnions and tubes, while permitting the former to revolve freely within the latter, tubes F G, depending from said arms I K, said tubes being partially filled with mercury, pipe or tube H, connecting the lower ends of said tubes F G, braces, as $h$, connecting the lower ends of said tubes with arms I K, pointer $h^3$, and graduated arc $h^4$, arranged and operating substantially as and for the purpose described.

5. The combination, with two tubes, D E, and the gage F G H I K, constructed and operating substantially as described, of a recording apparatus connected to said gage, such as the rod $h^5$, marking-instrument $h^6$, and the cylinder M, for imparting a revolving movement to a sheet of paper, whereby a permanent record of the movements of said gage will be made, substantially as set forth.

6. The combination, with two tubes, D E, and the oscillatory gage composed of arms I K, and mercury-containing tubes F G H, applied to and operating in connection with said tubes D E, substantially in the manner described, said gage having the pointer $h^3$, of graduated arc $h^4$, having its zero-point located at or near one end thereof, and weights N O, secured to said gage, said weights being so adjusted relatively that said pointer $h^3$ will stand at the zero-point on said arc when the mercury stands at the same level in tubes F G, substantially as and for the purpose set forth.

CLEMENS HERSCHEL.

Witnesses:
W. H. CHAPMAN,
F. L. TUTTLE.